United States Patent
Grünbacher et al.

(10) Patent No.: US 7,039,541 B2
(45) Date of Patent: May 2, 2006

(54) METHOD FOR CONTROLLING A TEST BENCH

(75) Inventors: Engelbert Grünbacher, Vöcklabruck (AT); Gerald Steinmaurer, Wels (AT); Peter Langthaler, Puchenau (AT); Luigi Del Re, Linz (AT); Helmut Kokal, St. Josef (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/785,479

(22) Filed: Feb. 25, 2004

(65) Prior Publication Data

US 2004/0181356 A1    Sep. 16, 2004

(30) Foreign Application Priority Data

Feb. 28, 2003   (AT)   .......................... GM 130/2003

(51) Int. Cl.
*G01M 17/00*    (2006.01)
(52) U.S. Cl. .................. 702/113; 702/44; 702/108; 701/29; 701/35; 701/36; 73/862
(58) Field of Classification Search ................ 702/113, 702/109, 115, 44, 108; 701/101, 29, 35, 701/36; 290/40 R, 14–17; 123/549, 396, 123/320, 339.16; 73/862
See application file for complete search history.

(56) References Cited

U.S. PATENT DOCUMENTS

| | | | |
|---|---|---|---|
| 4,090,401 A | 5/1978 | Yamamoto et al. | |
| 5,521,824 A | 5/1996 | Eagan et al. | |
| 6,311,670 B1 * | 11/2001 | Constancis | 123/352 |
| 6,373,144 B1 * | 4/2002 | Frohlich et al. | 290/40 R |

FOREIGN PATENT DOCUMENTS

| | | |
|---|---|---|
| DE | 3914723 | 6/1990 |
| DE | 4428818 | 2/1996 |
| DE | 19819445 | 11/1999 |
| EP | 1048943 | 11/2000 |
| EP | 1048943 A2 * | 11/2000 |
| GB | 2155659 | 9/1985 |

\* cited by examiner

*Primary Examiner*—John Barlow
*Assistant Examiner*—Hien Vo
(74) *Attorney, Agent, or Firm*—Dykema Gossett PLLC

(57) ABSTRACT

In a test bench design consisting at least of an internal combustion engine (1) having its own sensor technology, actuator technology and control devices, a dynamometric brake (2), and a test bench computer (5) controlling the internal combustion engine (1) and the dynamometric brake (2), whereby the computer (5) calculates the control variables for the internal combustion engine (1) and the dynamometric brake (2) based on set point defaults, the object to operate the internal combustion engine (1) with the assistance of the dynamometric brake (2) in the same way as the engine would be operated by the user in a selected vehicle and with the driving profile to be set by the user is achieved by conducting a predefined measurement prior to the actual measurement, which cannot be performed precisely by the user himself, and based on the measurement, parameters of a calculation specification (9) of set point defaults of the control variables are to be determined under consideration of the characteristics of the test bench and then set on the test bench computer (5) without changing the parameter setting of the test bench computer (5) or of the control device of the internal combustion engine.

5 Claims, 2 Drawing Sheets

METHOD FOR CONTROLLING A TEST BENCH

BACKGROUND OF THE INVENTION

1. Field of the Invention

The invention relates to a method for controlling a test bench for an internal combustion engine connected on the drive-side to a dynamometer brake intended as a drive engine of a vehicle whereby a vehicle model and a driving profile for the vehicle are preset through a test bench computer, and whereby the internal combustion engine runs through the same operating points as it would run during the preset driving cycle corresponding to the vehicle model and the set point defaults of the control units of the internal combustion engine and the dynamometric brake as determined by the test bench design.

2. The Prior Art

Methods of the aforementioned type are known in the art and they are primarily (but not exclusively) used in the motor vehicle industry to be able to perform realistic tests of the internal combustion engine prior to its installation into the vehicle. The design of a corresponding test bench is diagrammatically illustrated in FIG. 1. The internal combustion engine 1 is connected on the drive-side to a dynamometric brake 2 and is provided with a device 3 controlling the same, generally called an ECU (engine control unit). In addition, there is a test bench computer 5 connected, which has its own control systems 6 to control the corresponding actuators on the internal combustion engine and to control the operating point of the dynamometric brake 2, whereby the computer acquires or computes the most important operating variables of the internal combustion engine 1 from the corresponding measuring units. The individual control systems 6 of the test bench computer 5 are in the rule set up as secondary control units which keep the output of a given actuator equal to the value of a corresponding set point. Set points are mostly determined by the user, e.g., in the form of a default of RPM (n) and torque (M) or pedal valuator position ($\alpha$); however, they can be pre-stored or calculated by another program. Furthermore, such a test bench can also include a transmission 4 and/or a clutch 7.

Such test bench designs are used in the present case to test the behavior of the internal combustion engine in case of its employment in a vehicle prior to its installation. It is important in such a case that the internal combustion engine 1 is operated corresponding to the intended use. This is primarily specified by vehicle parameters and by a driving profile 8, which must be kept within certain limits. This requires, among other things, the simulation of control variables in the manner in which an operator experienced in roll dynamometer operations would preset control variables. This can no longer be preset by the user since it requires a corresponding computation specification 9 that estimates, among other things, the virtual speed of the vehicle to be driven by the internal combustion engine and whose operation reacts exactly the same as an experienced driver would do. The computation specification used for the simulation of driver behavior can be designated as driver model or driver control unit since a driver operates in actuality like a control unit. The dynamometric brake 2 must also bias the internal combustion engine 1 with the load moment that corresponds to the load on the internal combustion engine in an actual vehicle.

To achieve a realistic simulation of driving conditions, a costly synchronizing effort is necessary according to the current state-of-the-art of test benches of this type whereby the synchronizing effort has as its goal to repeat the test run over and over and to synchronize the parameters of the driver model and also that of the test bench control units after each test run until such a time when the result becomes satisfactory in total. According to current art, the parameters are then basically frozen and maintained during the time of the actual test.

Nevertheless, there are proposals, as for example in DE 4428818 or DE 4428815, which explicitly provide the possibility of monitoring the operational variables of the internal combustion engine during the test run and to select a control unit from a predetermined quantity or to correspondingly adapt the control unit parameters. These methods require, nevertheless, that at least the parameters for the operation of the internal combustion engine are set for the first test bench run prior to the start of taking measurements. In other words, the arrangement would have had to be sufficiently known from the beginning and a parameter set usable for the specific test bench run would have had to be determined in some way. These methods also provide possibilities to conduct the planned test run one time and to adapt the parameters to this test run.

The above-mentioned known methods have particularly the disadvantage that the determination of the parameter of the first necessary parameter set is very time-consuming and can occur only iteratively. Experienced test bench operators are necessary to be able to arrive at specific results at a reasonable time at all. In addition, in many tests, for example in cold start tests, lengthy cool-down periods are to be maintained between individual test bench runs, which then lead altogether to extremely lengthy preparation times for the actual measurements.

It is the object of the present invention to avoid the aforementioned disadvantages and to make the above-mentioned complicated pre-adjustments for a first usable parameter set unnecessary.

SUMMARY OF THE INVENTION

The above-mentioned object is achieved according to the present invention with a method of the aforementioned type in that the parameters necessary for the determination of the set point defaults are to be determined and set on the test bench computer prior to the actual test run and in a measuring phase independent thereof, and that the operational variables are monitored during the actual test run and used for the adjustment of the parameters of the set point defaults, if required. The intended test run is not performed in the first phase but a specific and the most possible brief measurement is performed by the user himself without default setting of parameters whereby the measurement is directed only to the safety limits of the operation of the engine. These safety limits determine the measurement range dependent on the control variable and they can be simply taken from the parameter set of the test bench.

Additional characteristics and advantages of the inventive method as well as preferred embodiments are described in more detail in the following with the aid of the attached drawings.

DETAILED DESCRIPTION OF THE PREFERRED EMBODIMENT

Figure 1:
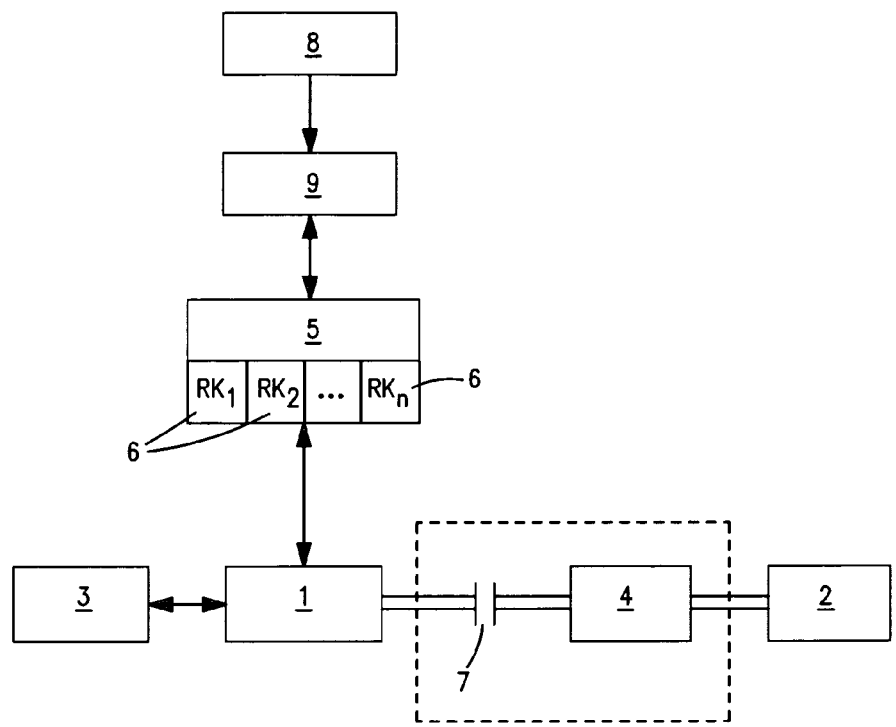
FIG. 1 depicts the arrangement according to the prior-art.
Figure 2:
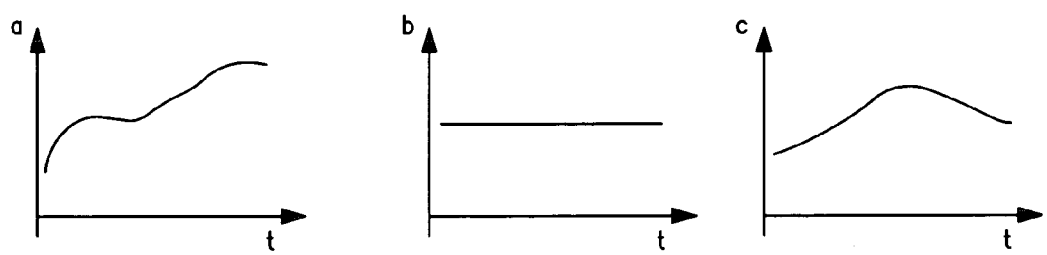
FIG. 2 shows a pre-established measurement phase with the aid of exemplary measurement diagrams according to the invention.

FIG. 2 illustrates in an exemplary fashion pre-measurements in the method according to the invention. One input (a) of the test piece (or the output of a servo unit) is changed according to a set profile, the majority of the remaining inputs (here b) are kept constant while an output (here c) is used as an information channel. In this way, it is possible to establish two stationary transfer functions between two channels, or to synchronize non-linear transfer functions as indicated in FIG. 3 (in FIG. 3, the performance graph is identified with number 10, a lag element with number 11, and a low-pass element with number 12).

Figure 3:
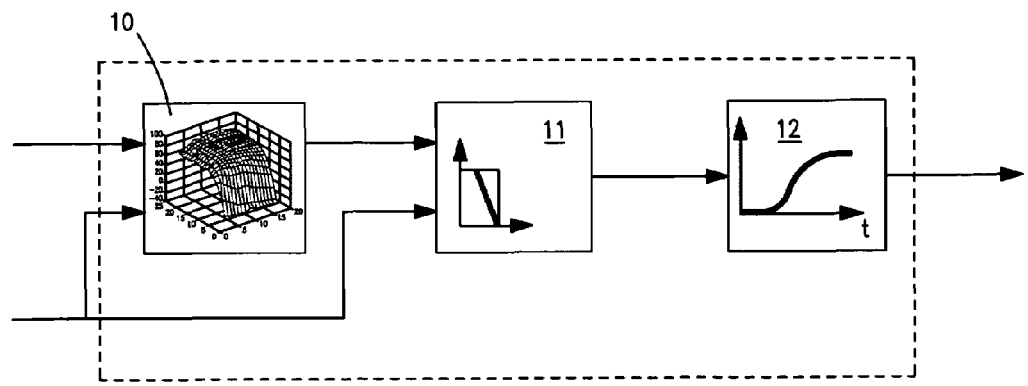
FIG. 3 shows the associated non-linear transfer functions.

FIG. 3 shows a possible example of a pre-test of a test bench run, and illustrates the accepted system structure whereby the low-pass element 12 relates to the dynamics of the internal combustion engine and the dynamics of the control unit connected in series including the local control systems provided in the test bench computer whereby the local control systems are not to be changed through this invention. Depending on the design of the engine, the dynamics or other control functions of the control units, which are usually designated to an internal combustion engine, can be included in the lag element 11. The operational sequences propose the crossing of dynamic curves, in contrast to DE 4428815, which means therefore that there are no stationary measurements which can be designated to one individual operating point at a progressive change of the actuator. That would be the throttle valve in case of a spark ignition engine or the fuel pump adjustment in case of a diesel engine, for example. A separate analysis of the stationary and dynamic behavior is useful for the pre-measurement based on the special system structure in FIG. 3. Furthermore, the time used for pre-measurement can be reduced through eliminating the dynamic measurement without losing thereby the functioning capability of the computation specification (9).

Figure 4:
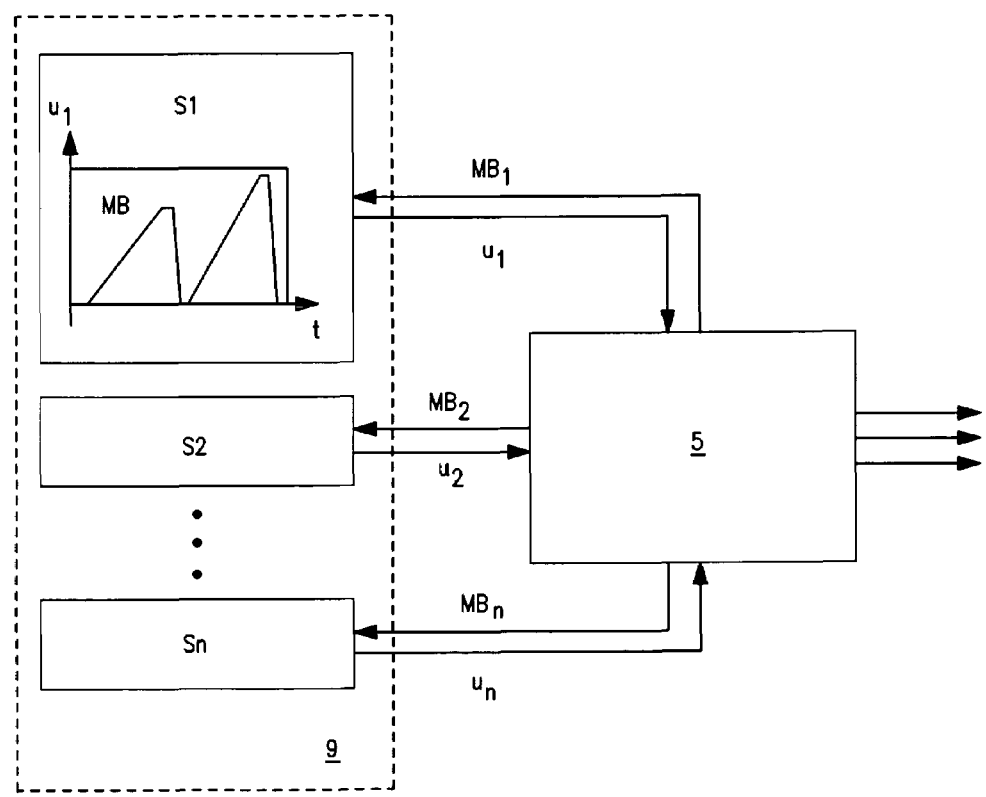
FIG. 4 shows an example of a part of the actual measurement arrangement to carry out the method according to the invention.

The actual measuring arrangement to carry out the inventive method is illustrated in FIG. 4 in an exemplary fashion. The test bench computer 5 supplies the information, stored therein through security areas, to the computation specification 9, which determines the actual course of measuring on this basis according to FIG. 2. Such measurements have advantageously the sequence illustrated in the upper left section of FIG. 4, which are in fact torque ramps (MB).

Combinations of RPM (n) and torque (M) or pedal valuator position ($\alpha$) are known as essential control and measuring variables for test benches. These variables are accessible on each test bench and can be used for control. Any measurement or control variable expansion (or change) of test benches is optional and therefore not suited as basis of an extremely universal, usable control structure and it results thereby in extended time for pre-measurement.

Based on this first measurement, which is not further connected to the actual test run, parameters of an engine model or the parameters of the driver model are determined, which are necessary for the calculation of the set points of the control variables (S1 . . . , Sn). There are no control systems of the test bench computer 5 changed (for instance torque or RPM controls) which are necessary for the general operation of the test bench and which are also used for other measurements, e.g., stationary performance graph measurements. Determined are thus defaults for the control systems of the control unit of the internal combustion engine and for the dynamometric brake, which are set by the test bench computer 5, but which does not change any parameters of these control systems or the control systems of the control unit of the internal combustion engine.

The user sees as a special characteristic of the inventive method that in case on an internal combustion engine not yet known, a special measurement is performed without the need for the user to input defaults or specific parameters, which will be explained below by example. Of course, forms of intermixing is possible to calculate the set points based on parameter inputs whereby such a set point calculation can be combined with other specifications. There is additionally the possibility for the user to use a specifically optimized calculation specification for his particular use.

The inventive method is further characterized in that the determination of the entire default for the control systems of the test bench computer occurs in a test-bench-dependent manner. This means in concrete terms that the same input by the user leads to different sequences of control variables after the test run at different test benches or different internal combustion engines. This is caused by the fact that the interconnection of the control systems of the test bench computer, the internal combustion engine, and the dynamometric brake is analyzed as a total system, which means, clearly different sequences of control variables are to be maintained in the transfer of the same parameter set resulting from this adaptation to another test bench with the same internal combustion engine. Characterizing is further the fact that adaptation of the set point calculation continues during the entire test run. The parameter set determined at the end of the test run can be used for the determination of the control variable for a new run (but does not have to) whereby, in the rule, considerably better results are achieved. Errors in the computation of control variables are minimized by the repeat renewal of the parameter set whereby the errors occur based on inaccuracy in the determination of the first parameter set or based on changes of the ambient variables of the test bench.

Methods are known admittedly in other areas of the technology with which a system can be pre-defined in a first phase. Known are identification methods for the dynamics of the path in machine tools, for example, and pre-tests are also common in another area of vehicle technology, that is, in the operation of driving robots in roll dynamometer tests. However, these pre-tests apply to a considerably simpler environment since there exists an actual vehicle in these cases, on one hand, and a dynamometric brake is not influenced, on the other hand, whereas we are dealing in the presently described invention with a method for the total behavior of the combination of internal combustion engine, the test bench computer, and the dynamometric brake without the presence of an actual vehicle so that behavior of the load of the internal combustion engine can also be determined through these processes.

The invention claimed is:

1. A method for controlling a test bench for an internal combustion engine connected on a drive side to a dynamometer brake and intended as a drive engine of a vehicle whereby a vehicle model and a driving profile for the vehicle are preset through a test bench computer and whereby the internal combustion engine runs through identical operating points as in a preset driving cycle corresponding to the vehicle model and set point defaults of the control units of the internal combustion engine and the dynamometric brake as determined by test bench design, comprising the sequential steps of determining parameters of the set point defaults by operating the internal combustion engine in a measuring phase, inputting said parameters as initial parameters in said test bench computer, running said internal combustion engine in an actual test run, and monitoring operational variables of said internal combustion engine for adjustment of said parameters in said test bench computer.

2. A method according to claim 1, wherein during the measuring phase at least one quasi-stationary measurement is performed in a multi-dimensional performance graph in which always one variable is changed, one is measured, and the remaining variables are kept constant.

3. A method according to claim 2, wherein said measurement is n, M or α (pedal valuator position).

4. A method according to claim 2, wherein during the measuring phase at least one dynamic measurement is additionally performed in which one of the variables is changed in great steps, one is measured, and the remaining variables are kept constant.

5. A method according to claim 1, whereby sequence accuracy of the driving profile is changed through different weighting of factors of the parameters during the determination of the set point defaults whereby the type of simulated driver is changed as well.

* * * * *